United States Patent
Dutordoir et al.

(10) Patent No.: US 11,027,743 B1
(45) Date of Patent: Jun. 8, 2021

(54) EFFICIENT COMPUTATIONAL INFERENCE USING GAUSSIAN PROCESSES

(71) Applicant: PROWLER .IO LIMITED, Cambridgeshire (GB)

(72) Inventors: Vincent Dutordoir, Cambridge (GB); James Hensman, Cambridge (GB); Nicolas Durrande, Cambridge (GB)

(73) Assignee: SECONDMIND LIMITED, Cambridge (GB)

( * ) Notice: Subject to any disclaimer, the term of this patent is extended or adjusted under 35 U.S.C. 154(b) by 0 days.

(21) Appl. No.: 16/836,116

(22) Filed: Mar. 31, 2020

(51) Int. Cl.
| | |
|---|---|
| *B60W 40/12* | (2012.01) |
| *G05B 13/02* | (2006.01) |
| *B60W 50/04* | (2006.01) |
| *B60W 10/30* | (2006.01) |
| *B60W 10/06* | (2006.01) |
| *B60W 10/18* | (2012.01) |

(52) U.S. Cl.
CPC .......... *B60W 40/12* (2013.01); *B60W 50/04* (2013.01); *G05B 13/028* (2013.01); *B60W 10/06* (2013.01); *B60W 10/18* (2013.01); *B60W 10/30* (2013.01)

(58) Field of Classification Search
CPC ...... B60W 40/12; B60W 50/04; B60W 10/06; B60W 10/18; B60W 10/30; G05B 13/028
See application file for complete search history.

(56) References Cited

U.S. PATENT DOCUMENTS

| | | | | |
|---|---|---|---|---|
| 2010/0001880 | A1* | 1/2010 | Kraft, IV | G08G 1/096716 340/905 |
| 2010/0305858 | A1* | 12/2010 | Richardson | G06K 9/00785 701/301 |
| 2014/0279786 | A1* | 9/2014 | Grokop | G06N 7/005 706/46 |
| 2018/0074170 | A1* | 3/2018 | Ray | G01S 5/0278 |
| 2020/0104647 | A1* | 4/2020 | Pirim | G06K 9/6293 |
| 2020/0238981 | A1* | 7/2020 | Seo | G05D 1/0255 |
| 2020/0341466 | A1* | 10/2020 | Pham | G01C 21/26 |
| 2020/0406925 | A1* | 12/2020 | Du | B60W 30/025 |

OTHER PUBLICATIONS

Hensman, et al., "Variational Fourier Features of Gaussian Processes", *Journal of Machine Learning Research*, 18, 2018, pp. 1-52.
Wilk, et al., A Framework for Interdomain and Multioutput Gaussian Processes, 2020, Imperial College London, m.vdwilk@imperial.ac.uk, Prowler.io., Cambridge, U.K., pp. 1-28.

* cited by examiner

*Primary Examiner* — Hussein Elchanti
(74) *Attorney, Agent, or Firm* — Kilpatrick Townsend Stockton LLP

(57) ABSTRACT

A system configured to determine candidate sets of values for enforceable parameters for a physical system, and for each candidate set of values, determine a performance measurement for the physical system and generate a data point having an input portion indicative of the candidate set of values and an output portion indicative of the determined performance measurement. The system is further arranged to augment each data point to include an additional dimension comprising a bias value; project each augmented data point onto a surface of a unit hypersphere of the first number of dimensions; determine, using the projected augmented data points, a set of parameter values for a sparse variational Gaussian process, GP, on said unit hypersphere; and determine, using the sparse variational GP with the determined set of parameter values, a further set of values for the set of enforceable parameters.

20 Claims, 7 Drawing Sheets

EFFICIENT COMPUTATIONAL INFERENCE USING GAUSSIAN PROCESSES

TECHNICAL FIELD

The present invention relates to computationally efficient methods of performing computational inference using Gaussian process models. The method has particular, but not exclusive, relevance to the implementation of Gaussian process modelling using novel integrated circuits configured for efficient utilisation of parallel processing and, potentially, low-precision arithmetic.

BACKGROUND

Gaussian process (GP) models provide a powerful and flexible means of inferring statistical information from empirical data. In recent years, GP models have been used in various contexts in machine learning, for example in image classification tasks and in regression tasks in engineering. By combining GP models with Bayesian optimisation, powerful "black box" methods are obtained, allowing for optimal or near optimal values for parameters of a given system to be determined with little or no prior information about the dependence of the system on those parameters. Such methods are particularly valuable in applications where data is scarce and/or difficult to obtain, for example in engineering applications in which running experiments on a physical system is costly, both in terms of resources and time.

A GP is a collection of infinitely many indexed random variables of which every finite collection has a multivariate Gaussian distribution. The distribution of a Gaussian process is the joint distribution of the infinitely many random variables, and as such can be considered as a distribution over functions on a continuous domain. In atypical GP inference task, the objective is to fit a latent GP to a set of observed training data $D=\{(x_n, y_n)\}_{n=1}^N$ such that the trained GP can be used to predict a distribution of an output value $y^*$ at an unobserved input location $x^*$. This description encapsulates regression, in which an output y corresponds to one or more attributes of a corresponding input location x, and classification, in which an output y corresponds to a probability of the input location x being associated with a given class. A canonical single-layer GP model can be expressed as:

$$p(f)=GP(0,K), \; p(y|f)=\Pi_{n=1}^N p(y_n|f(x_n)), \quad (1)$$

where p denotes the probability density function, $y=\{y_n\}_{n=1}^N$, and it has been assumed that the likelihood $p(y|f)$ factorizes over the training data in the dataset D, which corresponds to the assumption that the training outputs $y_n$ can be modelled as independent random variables. The GP prior $p(f)$ is defined by a kernel K. Training of the GP model amounts to determining or approximating the posterior process $p(f|y)$ corresponding to the GP prior conditioned on the training data. In the model of Equation (1), the function $f$ and the outputs $y_n$ are written as scalars, but the methods described herein are equally valid for multi-output GPs in which the function $f$ and optionally the outputs $y_n$ are vectors.

In the canonical example of regression with Gaussian likelihood, the posterior process $p(f|y)$ has a known closed-form expression, the computation of which is referred to as exact Gaussian process regression. However, computing this expression involves the numerical inversion of a dense N×N matrix, which requires $O(N^3)$ operations. This poor scalability with respect to the size of the dataset effectively limits the applicability of exact Gaussian process regression to small datasets.

For GP models other than regression with Gaussian likelihood, the posterior process does not admit a closed-form expression and is computationally intractable. For these models, approximate inference methods must be used instead. A particularly efficient approximate inference method, applicable to all GP models, is sparse variational inference. Sparse variational inference proceeds with the introduction of a set $u=\{u_m\}_{m=1}^M$ of inducing variables defined by Equation (2):

$$u_m = \int f(x) g_m(x) dx \quad (2)$$

where $\{g_m\}_{m=1}^M$ is a set of inducing functions. In the earliest version of sparse variational inference, the inducing variables were given simply by $u_m = f(z_m)$, where $\{z_m\}_{m=1}^M$ is a set of inducing inputs in the same domain as the input data x, corresponding to inducing functions given by the Dirac delta distribution $g_m(x) = \delta(x - z_m)$.

Irrespective of the choice of inducing functions, the inducing variables $u_m$ are assumed to be distributed according to a variational Gaussian distribution $q(u)=N(u|m, S)$, where the mean m and covariance S are variational parameters to be learned during training. An approximate posterior process $q(f)$ is then defined by Equation (3):

$$q(f) = \int p(f|u_m = \int f(x) g_m(x) dx \, \forall m \in [1:M]) q(u) du. \quad (3)$$

The approximate posterior process $q(f)$ is a GP with a mean function $\mu(x)$ and a covariance $v(x, x')$ given by Equations (4) and (5):

$$\mu(x) = k_u^T(x) K_{uu}^{-1} m, \quad (4)$$

$$v(x,x') = k(x,x') + k_u^T(x) K_{uu}^{-1}(S - K_{uu}) K_{uu}^{-1} k_u(x). \quad (5)$$

where $[k_u(x)]_m = \mathbb{E}[u_m f(x)]$ and $[K_{uu}]_{m,m'} = \mathbb{E}[u_m u_{m'}]$. It is noted that the values of the inducing variables in the sparse variational framework are never calculated, only the associated covariances between the inducing variables and the GP $f$.

During training, values are determined for the variational parameters m, S, along with any hyperparameters of the model, to minimise the Kullback-Leibler (KL) divergence between the approximate posterior process $q(f)$ and the intractable exact posterior process $p(f|y)$. The KL divergence is given by Equation (6):

$$KL[q(f) \| p(f|y)] = \log p(y) - \mathcal{L}, \quad (6)$$

where $$\mathcal{L} = \sum_{n=1}^N \mathbb{E}_{q(f(x_n))}[\log p(y_n | f(x_n))] - KL[q(u) \| p(u)]. \quad (7)$$

The KL divergence in Equation (6) is non-negative, with equality when the approximate posterior process $q(f)$ matches the exact posterior process $p(f|y)$. The quantity $\mathcal{L}$ is therefore a variational lower bound of the marginal log-likelihood $\log p(y)$. Maximising $\mathcal{L}$ with respect to the variational parameters m, S minimises the KL divergence between the approximate posterior process and the exact posterior process. Maximising $\mathcal{L}$ with respect to the hyperparameters of the kernel maximises the marginal likelihood $\log p(y)$ of the training data, or in other words how well the exact model fits the training data. By treating the variational bound as an objective function to be maximised with respect to the variational parameters and the hyperparameters simultaneously, the approximate GP approaches an optimal posterior process for the chosen kernel, given the training data.

For examples in which the likelihood is Gaussian, optimal values of the variational parameters, as well as the resulting optimisation objective $\mathcal{L}$, are known in closed form. In all other cases, the optimisation objective is intractable and numerical estimation is required, for example using Monte-Carlo sampling. In an example, the objective function $\mathcal{L}$ is maximised (or equivalently, $-\mathcal{L}$ is minimised) with respect to the variational parameters and the hyperparameters using stochastic gradient ascent/descent or a variant thereof. In any of these cases, it is necessary to invert the M×M covariance matrix $K_{uu}$, resulting in a computational cost at training time of $O(M^3)$ high-precision floating point operations which must be performed in a serial fashion and therefore cannot be parallelised in an efficient manner. The cost of inverting the covariance matrix can become prohibitive in terms of both time and computational resources for large numbers of inducing functions, which are necessary to learn the complex structures that exist within large datasets. On the other hand, choosing a value of M which is too small prevents the GP model from accurately capturing the latent information underlying the data.

For the reasons set out above, the need to numerically invert a dense covariance matrix leads to a bottleneck both in exact GP regression and in sparse variational inference, and prevents either method from being implemented efficiently using specialist machine learning hardware, which is typically optimised for highly parallelised computation using low-precision arithmetic.

A particular implementation of sparse variational inference, discussed in the article "Variational Fourier Features for Gaussian Processes" by Hensman et al, Journal of Machine Learning Research, 18:151-1, 2017, uses inducing variables defined in terms of a Matérn reproducing kernel Hilbert space (RKHS) inner product between the GP and elements of a truncated Fourier basis. The resulting covariance matrix $K_{uu}$ has elements with closed-form expressions in terms of the spectrum of the Matérn kernel, and is expressible as a sum of a diagonal matrix and a low rank matrix, which can be numerically inverted at a lower cost than that of inverting a dense matrix. As a result, this approach removes the computational bottleneck caused by the inversion of the covariance matrix. However, the closed-form expressions are only available for the restricted class of Matérn kernels in one dimension, and the computational advantages of the variational Fourier features approach is therefore limited to these kernels.

Although it is possible to extend the method of variational Fourier features to higher numbers of dimensions by introducing a separable kernel with Matérn kernel factors, the resulting scheme is restrictive and has a computational complexity that increases exponentially with the number of input dimensions. The variational Fourier features method is therefore impracticable even for relatively modest numbers of input dimensions. In engineering applications, where the aim is typically to determine optimal values for a set of physical parameters of a physical system of interest, the input dimension of each data point is equal to the number of parameters to be optimised. The number of parameters can be large, and therefore the method of variational Fourier features is not applicable in such scenarios for the reasons.

For an appropriate choice of kernel function, GP models have a high expressive capacity which can be further increased by composing multiple GP layers to form a deep Gaussian Process (DGP) model. Due to their high expressive capacity, GP models and DGP models offer a potential alternative to deep neural network (DNN) models for a variety of applications, and furthermore have certain advantages over DNN models. For example, GP models automatically yield well-calibrated uncertainty estimates, which are of particular importance when high-impact decisions are to be made on the basis of the model predictions. Furthermore, GP models tend to perform well in sparse data regimes. However, to date, the practical limitation of GP models to small datasets and/or low-dimensional data has prevented GP models from being adopted as widely as DNN models.

SUMMARY

According to a first aspect, there is provided a system including: one or more sensors configured to measure one or more characteristics of a physical system having a plurality of enforceable parameters; processing circuitry; and memory circuitry. The memory circuitry stores machine-readable instructions which, when executed by the processing circuitry, cause the system to determine a plurality of candidate sets of values for the enforceable parameters, and for each of the candidate sets of values for the plurality of enforceable parameters: obtain, from the one or more sensors, a measurement of each of the one or more characteristics of the physical system; determine a performance measurement for the physical system based on the obtained measurements of the one or more characteristics of the physical system; and generate a data point having an input portion indicative of the candidate set of values and an output portion indicative of the determined performance measurement, the input portion having a first number of dimensions. The instructions further cause the system to augment each data point to: include an additional dimension comprising a bias value; project each augmented data point onto a surface of a unit hypersphere of the first number of dimensions; determine, using the projected augmented data points, a set of parameter values for a sparse variational GP on said unit hypersphere, the sparse variational GP having a zonal kernel and depending on a set of inducing variables randomly distributed according to a multi-dimensional Gaussian distribution and each corresponding to a reproducing kernel Hilbert space inner product between the GP and a spherical harmonic of the first number of dimensions; and determine, using the sparse variational GP with the determined set of parameter values, a further set of values for the plurality of enforceable parameters.

According to a second aspect, there is provided a processing unit for use in a computing system. The processing unit includes: a data interface configured to receive a plurality of data points each having an input portion and an output portion, the input portion having a first number of dimensions; and a plurality of processing nodes. Each processing node is configured to, independently of each other processing nodes of the plurality of processing nodes augment a respective subset of the data points to each include an additional dimension comprising a bias value; project each augmented data point of the respective subset onto a surface of a unit hypersphere of the first number of dimensions; process each projected augmented data point of the respective subset to determine a respective covariance vector with elements given by spherical harmonics in the first dimension evaluated at the projected augmented data point; and determine at least a portion of a diagonal covariance matrix with each element given by a variance of a respective one of a set of inducing variables randomly distributed according to a multi-dimensional Gaussian distribution and each corresponding to a reproducing kernel Hilbert space inner product between a sparse variational GP on said unit hypersphere and a spherical harmonic of the first number of dimensions. The processing unit is configured to determine a set of parameter values for the sparse variational GP using the determined covariance vectors and the determined diagonal covariance matrix.

According to a third aspect, there is provided a processing unit for use in a computing system. The processing unit includes: a data interface configured to receive a plurality of data points each having an input portion and an output portion, the input portion having a first number of dimensions; and a plurality of processing nodes. Each of the plurality of processing nodes is configured to, independently of each other processing node of the plurality of processing nodes: augment a respective subset of the data points to each include an additional dimension comprising a bias value; project each augmented data point of the respective subset onto a surface of a unit hypersphere of the first number of dimensions; process each projected augmented data point of the respective subset to determine a respective covariance vector with elements given by spherical harmonics in the first number of dimensions evaluated at the projected augmented data point; and determine at least a portion of a diagonal covariance matrix with each element given by a variance of a respective one of a set of inducing variables randomly distributed according to a multi-dimensional Gaussian distribution and each corresponding to a reproducing kernel Hilbert space inner product between a sparse variational GP on said unit hypersphere and a spherical harmonic of the first number of dimensions. The processing unit is further configured to determine a set of parameter values for the sparse variational GP using the determined covariance vectors and the determined diagonal covariance matrix.

By performing sparse variational inference on a unit hypersphere, accuracy and efficiency can be retained even for data with a large number of input dimensions. Furthermore, the computational bottleneck encountered in previous GP methods due to the inversion of a dense covariance matrix is removed from the training procedure. The data processing at each training iteration can therefore be performed in a highly parallelised manner, for example using multiple cores in a specialised processing unit. At a hardware level, quantization can be used to reduce the numerical precision of values used within the data processing routine, further improving the efficiency and speed of implementing the GP model. It is expected that the present invention will offer a competitive alternative to DNN models in a broad range of fields.

Further features and advantages of the invention will become apparent from the following description of preferred embodiments of the invention, given by way of example only, which is made with reference to the accompanying drawings.

DETAILED DESCRIPTION

Figure 1:
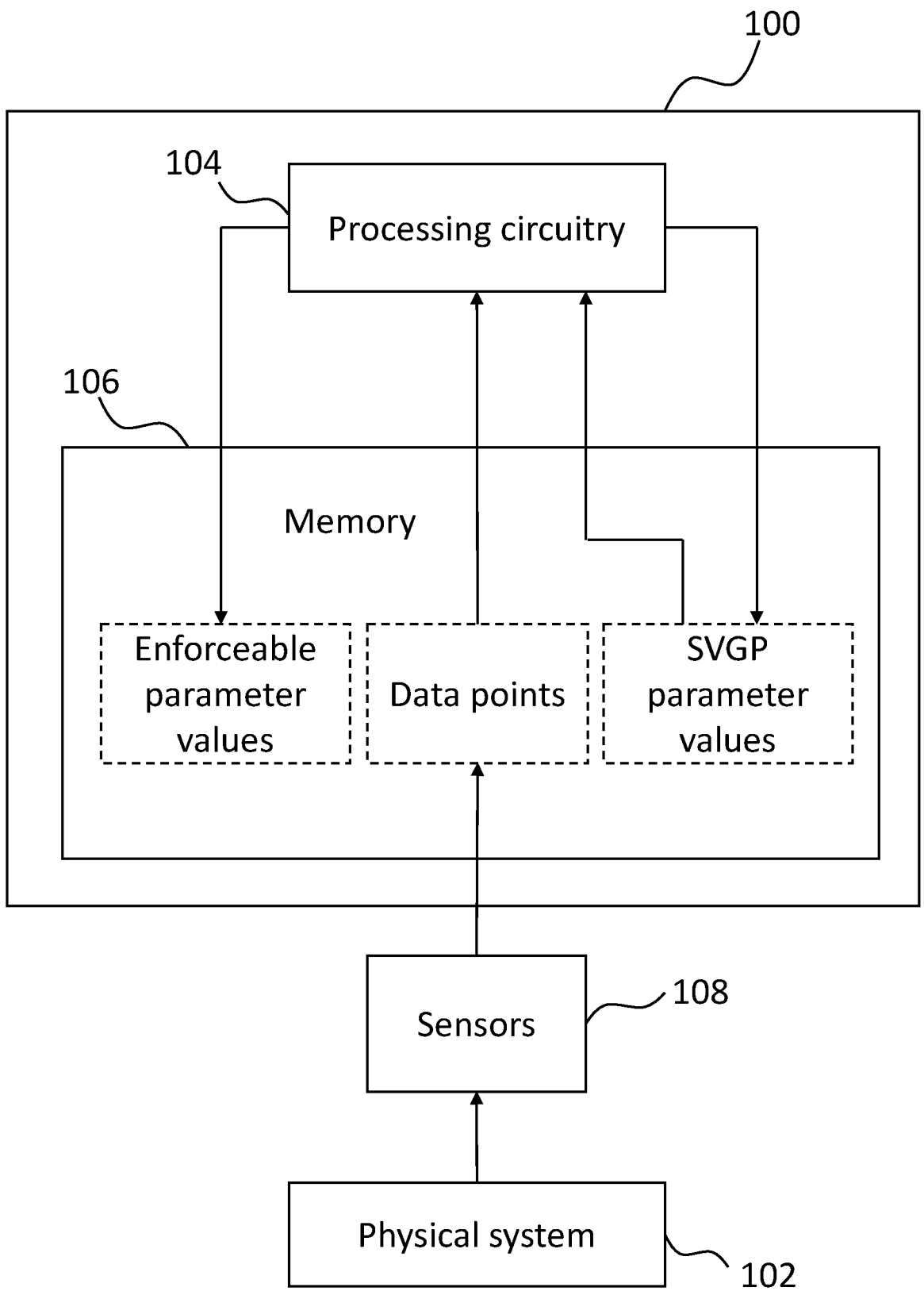
FIG. 1 shows schematically a data processing system arranged to determine parameter values for a physical system in accordance with examples.

FIG. 1 shows an example of a data processing system 100 arranged to determine values for a set of enforceable parameters of a physical system 102. The data processing system 100 includes processing circuitry 104 and memory circuitry 106. The memory circuitry 106 stores machine-readable instructions which, when executed by the processing circuitry 104, cause the data processing system 100 to perform methods in accordance with the present disclosure. The data processing system 100 includes various additional components not shown in FIG. 1 such as input/output devices, network interfaces, and the like. In the present example, the data processing system 100 is configured to receive data from sensors 104, which are arranged to obtain measurements of one or more characteristics of the physical system 102.

The processing circuitry 104 in this example includes a central processing unit (CPU) configured to execute machine-readable instructions stored in the memory circuitry 106, and a neural processing unit (NPU) with multiple processing nodes/cores. In other examples, the functions of NPU can instead be performed using one or more other types of processor, for example a central processing unit (CPU), a graphics processing unit (GPU), an application-specific integrated circuit (ASIC), and/or a digital signal processor (DSP).

The memory circuitry 106 in this example includes non-volatile storage in the form of a solid-state drive (SSD). In other examples, a data processing system may additionally or alternatively include a hard disk drive and/or removable storage devices. The memory circuitry 106 further includes working memory in the form of volatile random-access memory (RAM), in particular static random-access memory (SRAM) and dynamic random-access memory (DRAM).

In the present example, the physical system 102 includes components of a vehicle. Specifically, the system includes aerodynamic components of the vehicle for which various geometrical parameters can be modified. In other examples, a physical system could be a specific part of a vehicle such as an engine or a braking system, or could be an entire vehicle. Alternatively, a physical system could be, for example, any type of mechanical system, electrical system, chemical system, or a combination of the above.

Figure 2:
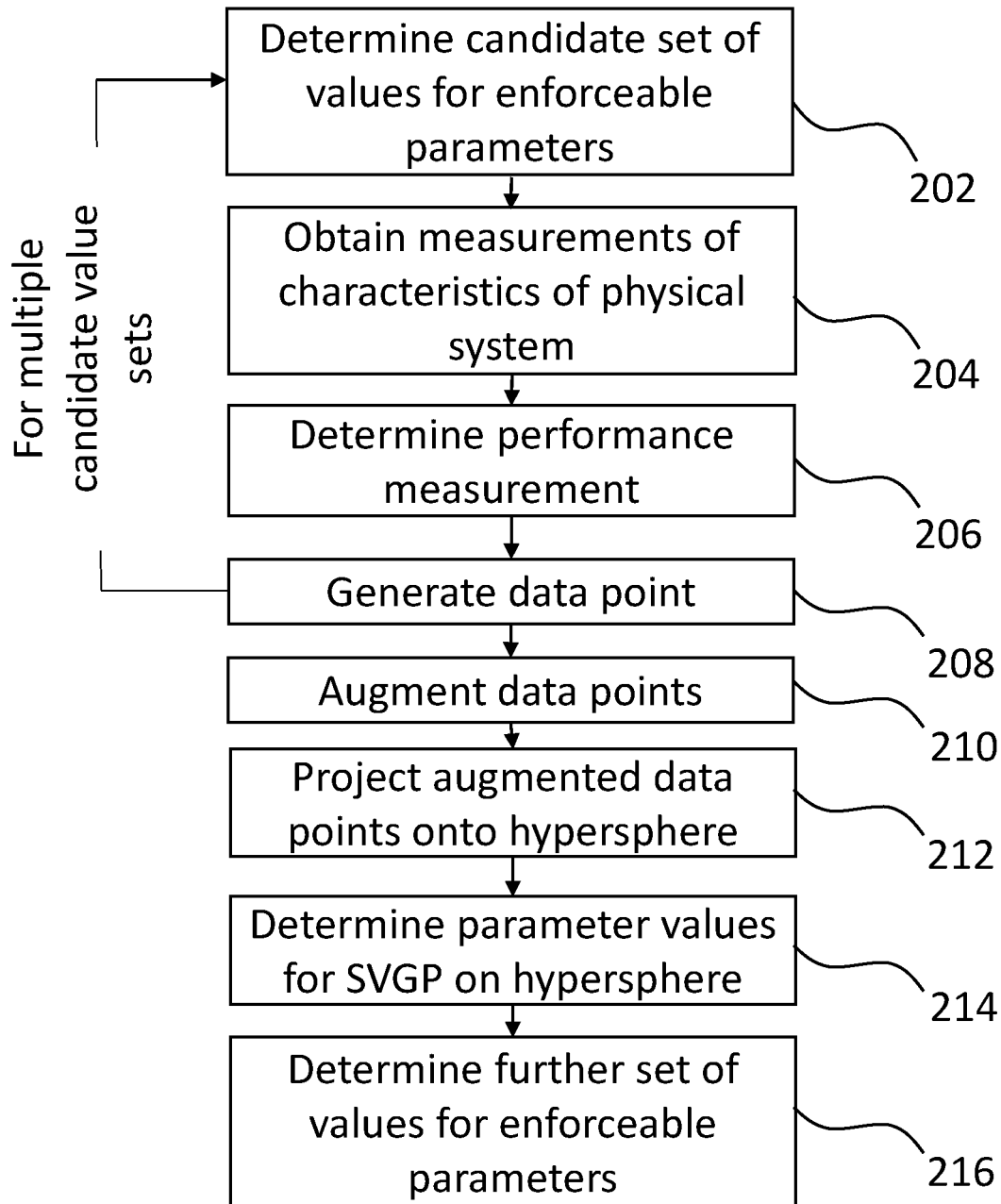
FIG. 2 is a flow diagram showing a method of determining parameter values for a physical system in accordance with examples.

FIG. 2 shows an example of a method performed by the data processing system 100 to determine values for the enforceable parameters of the physical system 102. The system determines, at 202, a candidate set of values for the enforceable parameters. In the present example, the candidate set of values is determined in accordance with a space-filling design over a predetermined parameter space, but the data processing system 100 can alternatively be configured to determine candidate sets of values in other ways, for example randomly or in response to user input.

The data processing system 100 obtains, at 204, measurements of one or more characteristics of the physical system 102 with the enforceable parameters set to the candidate set of values determined at 202. The measured characteristics are relevant for assessing of the performance of the physical system 102. In the present example, in which the physical system 102 includes aerodynamic components of a vehicle, the characteristics include measurements of downforce and drag generated when air is passed over the aerodynamic components at a predetermined flow rate. In this example, the characteristics are measured using the sensors 108.

The data processing system 100 determines, at 206, a performance measurement for the physical system 102 based on the measurements of the one or more characteristics of the physical system 102 obtained at 204. The performance measurement is a numerical value which is representative of how well the physical system 102 performs with a given set of parameter values, according to a predetermined metric. In the present example, the metric depends on the downforce and drag measurements obtained at 204.

The data processing system 100 generates, at 208, a data point $(\hat{x}_n, \hat{y}_n)$ having an input portion $\hat{x}_n \in \mathbb{R}^{d-1}$ and an output portion $\hat{y}_n \in \mathbb{R}$. The input portion $\hat{x}_n$ is indicative of the candidate set of values for the enforceable parameters, with each dimension of the input portion corresponding to one of the enforceable parameters. The output portion $\hat{y}_n$ of the data point has a single dimension and is indicative of the performance measurement for the physical system 102 determined at 206.

The data processing system 100 repeats 202 to 208 for different candidate sets of values, until a full dataset $\{(\hat{x}_n, \hat{y}_n)\}_{n=1}^{N}$ of N data points is generated, each data point corresponding to a different candidate set of values for the enforceable parameters. As mentioned above, in this example the candidate sets of values is determined according to a space filling design over a predetermined parameter space. The predetermined parameter space is bounded in each dimension by maximum and minimum values of the enforceable parameters. The space filling design covers the parameters space as evenly as possible for a given number of data points.

Once the full set of N data points has been generated, the data processing system 100 augments, at 210, all of the data points to include an additional input dimension set to a constant bias value b. The augmented input portion of the $n^{th}$ data point is therefore given by $\tilde{x}_n = (\hat{x}_n, b) \in \mathbb{R}^d$ and the output portion is still given by $\hat{y}_n$. The bias value b is a hyperparameter which can be predetermined or can be learned from the data, as will be explained in more detail hereinafter.

Figure 3:
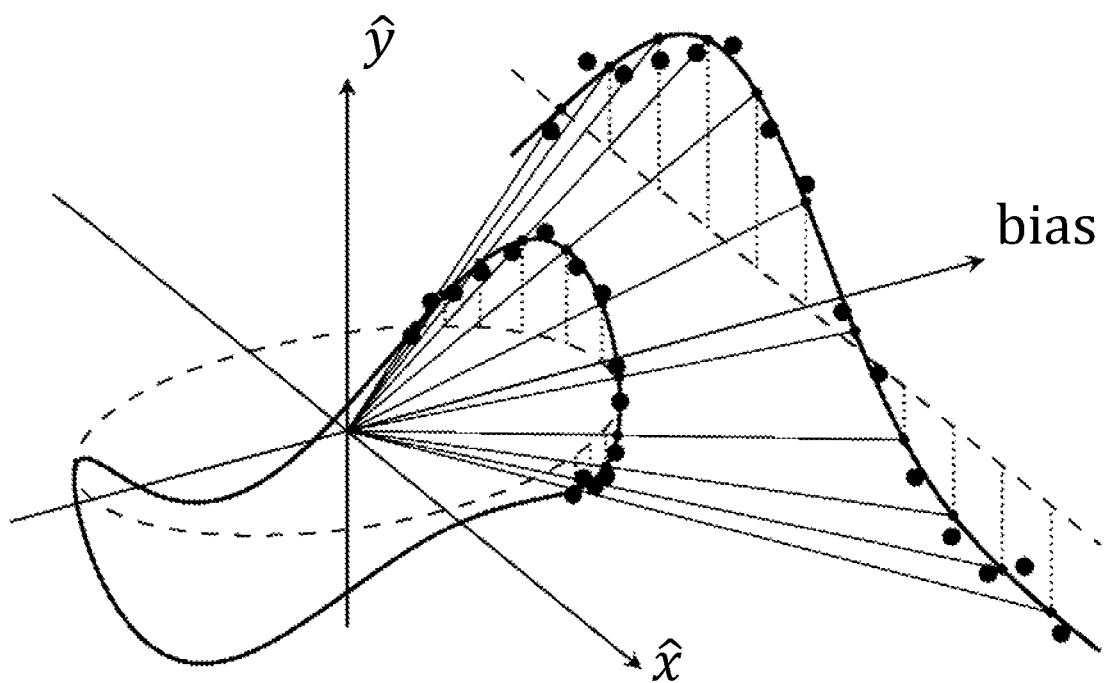
FIG. 3 illustrates a mapping of data points in accordance with examples.

The data processing system 100 projects, at 212, the augmented data points onto a unit hypersphere $\mathbb{S}^{d-1}$. The projection is a linear mapping given by $(\tilde{x}_n, \hat{y}_n) \rightarrow (x_n, y_n) := (\tilde{x}_n/|\tilde{x}_n|, y_n/|\tilde{x}_n|)$. The projection shrinks each augmented data point by a scale factor equal to the magnitude of the augmented input portion. The input portion of the data point is thereby mapped from the hyperplane $\mathbb{R}^{d-1}$ to the hyperspherical surface $\mathbb{S}^{d-1}$. FIG. 3 shows a visual representation of the mapping process for d=2. The original data points lie in the two-dimensional $\hat{x}$-$\hat{y}$ plane, each having a scalar input portion $\hat{x}_n$ lying on the real line (in other words, the hyperplane $\mathbb{R}^{d-1}$ with d=2), and a scalar output portion $\hat{y}_n$. The data points are translated to a plane parallel to the $\hat{x}$-$\hat{y}$ plane by augmentation with an additional dimension comprising a constant bias value b. The input portions of the augmented data points are then projected to the unit circle $\mathbb{S}^1$ using the linear mapping described above.

Returning to FIG. 2, the data processing system 100 processes, at 214, the projected augmented data points to determine a set of parameter values for a sparse variational Gaussian process (GP) on the unit hypersphere. The sparse variational GP has a zonal kernel K, which is invariant to rotations and can be represented in the form $K(x, x') = s(x^T x')$, where s is a given shape function. A key property of zonal kernels, which facilitates efficient GP inference in accordance with the present disclosure, is that any zonal kernel can be decomposed using a Mercer representation, as shown in Equation (8):

$$K(x, x') = \sum_{l=0}^{\infty} \sum_{k=1}^{N_l^d} \hat{a}_{l,k} \phi_{l,k}(x) \phi_{l,k}(x'), \tag{8}$$

where $\phi_{l,k}(\cdot)$ denotes the $k^{th}$ element of the $l^{th}$ layer of the spherical harmonic basis in $\mathbb{S}^{d-1}$, $N_l^d$ is the number of elements in the $l^{th}$ layer of the spherical harmonic basis in $\mathbb{S}^{d-1}$, and $\hat{a}_{l,k}$ are coefficients given by the Funk-Hecke equation, as shown by Equation (9):

$$\hat{a}_{l,k} = \int_{-1}^{1} s(t) C_l^{\frac{d-2}{2}}(t)(1-t^2)^{\frac{d-3}{2}} dt, \tag{9}$$

where $$C_l^{\frac{d-2}{2}} : [-1, 1] \rightarrow \mathbb{R}$$

is the Gegenbauer polynomial (also known as the generalised Legendre polynomial) of degree l, and $s(\cdot)$ is the shape function of the kernel K. The coefficients $\hat{a}_{l,k}$ can be calculated using Equation (9) for any zonal kernel. The resulting coefficients are independent of K, and have an alternative expression given by $\hat{a}_{l,k} = S(\sqrt{l(l+1)})$, where S denotes the spectrum of the Laplace-Beltrami operator on the unit hypersphere.

The sparse variational GP depends on a set of M randomly distributed inducing variables $u_m$, each given by a reproducing kernel Hilbert space inner product between the GP and a spherical harmonic on the unit hypersphere, as given by Equation (10):

$$u_m = \langle f, \phi_m \rangle_H, \tag{10}$$

where for consistency with existing sparse variational GP methods, the spherical harmonics $\phi_{l,k}$ have been re-indexed with a single index m ordered first by increasing level l, then by increasing k within each level l. The resulting index is given by $m = \sum_{j=0}^{l} N_{j-1}^d + k$, with $N_{-1}^d := 0$. Given the Mercer representation of a zonal kernel shown in Equation (9), the reproducing kernel Hilbert space inner product of two functions $g(x) = \sum_{l,k} \hat{g}_{l,k} \phi_{l,k}(x)$ and $h(x) = \sum_{l,k} \hat{h}_{l,k} \phi_{l,k}(x)$ is given by Equation (11):

$$\langle g, h \rangle_H = \sum_{l=0}^{\infty} \sum_{k=1}^{N_l^d} \frac{\hat{g}_{l,k} \hat{h}_{l,k}}{\hat{a}_{l,k}}, \tag{11}$$

which satisfies the reproducing property $\langle k(x, \cdot), f \rangle = f(x)$. Using this reproducing property, the mean $\mu(x)$ and a covariance v(x, x') of the sparse variational GP are given by Equations (4) and (5) respectively, with $[\ell_k(x)]_m = \phi_m(x)$ and $[K_{uu}]_{m,m} = \delta_{m,m}/\hat{a}_m$. In the present example, determining the set of parameter values for the sparse variational GP includes determining the mean m and covariance S of the distribution q(u), and further determining any hyperparameters of the kernel K, along with the bias value b. The hyperparameters of the kernel K determine characteristics of how the GP varies with the data. For example, Matérn kernels include a length scale hyperparameter which determines how rapidly correlations decay between nearby data points, which in turn affects how rapidly the GP is allowed to vary with the data. In other examples, hyperparameters of a kernel are fixed, for example on the basis of physical considerations. In the present example, the covariance parameter S is decomposed using Cholesky factorisation such that $S = LL^T$, where L is a lower triangular matrix referred to as a Cholesky factor. Decomposing the covariance parameter in this way ensures that the matrix S is positive definite and symmetric, as is required for a covariance matrix.

The data processing system 100 determines, at 216, a further set of values for the enforceable parameters of the physical system 102, using the sparse variational GP with the determined set of parameter values. In the present example, the data processing system 100 determines the further set of values for the enforceable parameters based on an expected performance measurement for the physical system 102. Specifically, the data processing system 100 determines the further set of values as those which attain a maximum mean value of the sparse variational GP as given by Equation (4).

Having determined the further set of values for the enforceable parameters of the physical system 102, the data processing system 100 may perform further measurements of the physical system 102 using the further set of values for the enforceable parameters, for example to verify that the further set of values results in improved performance of the physical system 102.

Although in the example described above the data processing system 100 is configured to determine an expected best set of values for the enforceable parameters, in other examples it is desirable instead to determine values for the enforceable parameters which will result in the most useful information being gathered about the dependence of physical system 102 on the enforceable parameters. This is likely to be useful during early stages of optimisation, when only a limited amount of prior information is available. In such cases, exploration may be favoured above exploitation. In an example, a new set of values for the enforceable parameters is determined on the basis of a predicted quantile, as opposed to an expectation value, as shown by Equation (12):

$$x_{new} = \mathrm{argmax}_x q_\alpha(y(x)), \quad (12)$$

where $x_{new}$ denotes the location on the hypersphere $\mathbb{S}^{d-1}$ corresponding to the new set of values for the enforceable parameters, $q_\alpha$ denotes the $\alpha$-quantile, and (x, y) denotes an arbitrary input-output pair predicted by the GP model. The new set of values for the enforceable parameters is determined by mapping the location $x_{new}$ on the hypersphere $\mathbb{S}^{d-1}$ back to the hyperplane $\mathbb{R}^{d-1}$.

The quantiles in Equation (12) are predicted by drawing multiple samples from the Gaussian process model. The value of $\alpha$ is selected depending on whether exploration or exploitation is required. For example, maximising the predicted ¼- quantile is a risk-averse choice, because the model predicts a 75% probability of the optimisation trace reaching higher than the predicted ¼-quantile. By contrast, maximising the predicted ¾- quantile is an optimistic choice, because the model predicts only a 25% probability of the optimisation trace reaching higher than the predicted ¾-quantile.

Figure 4:
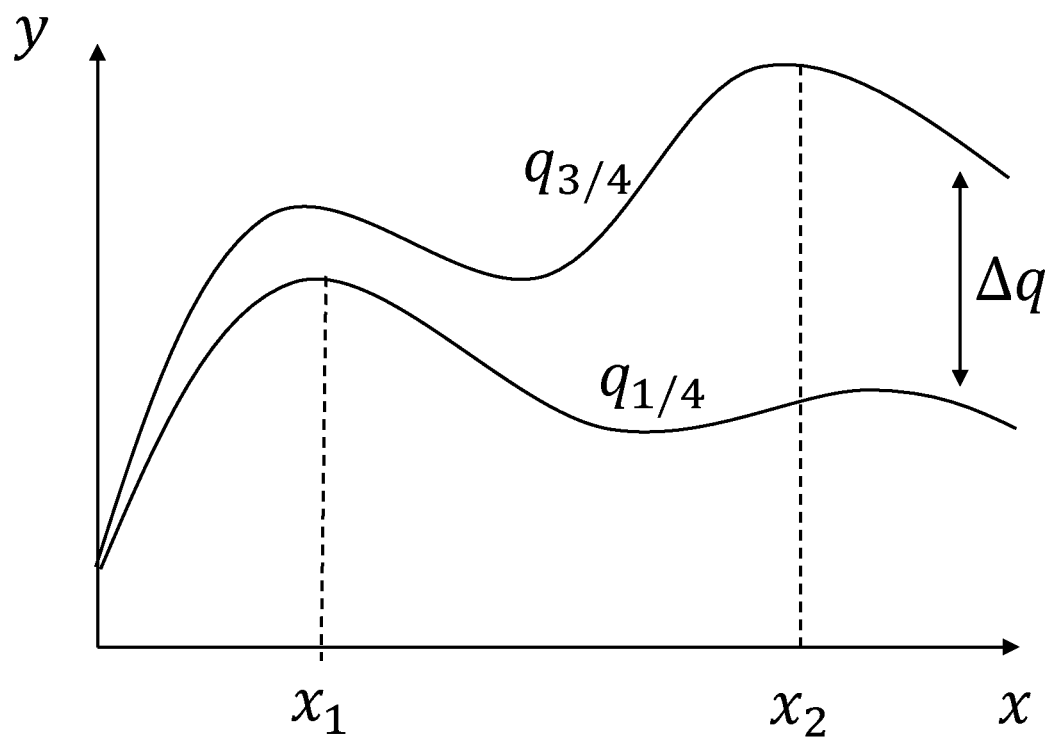
FIG. 4 shows an example of predicted quantiles of an output value corresponding to a performance measurement of a physical system as a function of values of an enforceable parameter of the physical system.

FIG. 4 shows an example of predicted quantiles of the output portion y corresponding to a performance measurement of a physical system with only one enforceable parameter, as a function of the input portion x corresponding to the value of the enforceable parameter. In this example, two values $x_1$ and $x_2$ are shown which maximise the predicted ¼-quantile $q_{1/4}$ and the predicted ¾-quantile $q_{3/4}$ respectively. It is observed that the predicted distribution of y for the risk-averse value $x_1$ has a narrow interquartile range $\Delta q$ representing low uncertainty, and a high lower quartile $q_{1/4}$, reflecting the fact that this choice of parameter value favours exploitation. By contrast, the predicted distribution of y for the optimistic value $x_2$ has a wide interquartile range $\Delta q$ representing high uncertainty, and a high upper quartile $q_{3/4}$, reflecting the fact that this choice of parameter value favours exploration. In other examples, alternative strategies may be used for determining the further set of values for the enforceable parameters. In some examples, the further set of values is determined on the basis of an acquisition function, for example based on entropy search or expected improvement.

In the present example, setting the values of the enforceable parameters involves modifying the physical properties of a prototype in accordance with the determined parameter values. In other examples, enforcing values of a set of enforceable parameters may include manufacturing a new prototype with the determined parameter values. The enforcing of parameters may be performed manually by a human operator, in a partially automated manner, or in a fully automated manner using one or more actuators. In further examples, data points are generated using a simulation or model of a physical system, as opposed to being generated from physical measurements of a physical system. Simulation typically allows for faster and cheaper generation of data than performing physical measurements, which may be imperative if a large parameter space needs to be explored. However, the accuracy of the performance measurements determined using a simulation of a physical system will necessarily be limited by modelling assumptions. In still further examples, parameter values are determined on the basis of historical data, for example retrieved from a database.

As will be explained in more detail hereafter, the present invention facilitates optimisation of physical systems with large numbers of parameters significantly faster than any other GP-based method. This is particularly valuable when a large and/or high dimensional parameter space needs to be explored, in which trial and error is impracticable and in which the computational cost of determining parameter values can be a limiting factor.

The present method of performing sparse variational inference on a hypersphere is not limited to the optimisation of parameters of a physical system, and can be used in any other application where GP models are applicable. For example, the present method can be used in any regression setting, where the output portion $\hat{y}$ of a data point is a scalar or vector quantity representing an attribute of the input portion $\hat{x}$. Regression problems arise, for example, in weather forecasting, climate modelling, disease modelling, medical diagnosis, time-series modelling, engineering applications, and a broad range of other applications.

In addition to regression problems, the present method is applicable to classification problems, in which case the output portion $\hat{y}$ represents probabilities associated with various respective classes. For a given training data item, a class vector $\hat{y}_2$ may therefore have a single entry of 1 corresponding to the known class of the data item $\hat{x}_n$, with every other entry being 0. In the example of image classification, the data item $\hat{x}_n$ has entries representing pixel values of an image. Image classification has a broad range of applications. For example, optical character recognition (OCR) is based on image classification in which the classes correspond to symbols such as alphanumeric symbols and/or symbols from other alphabets such as the Greek or Russian alphabets, or logograms such as Chinese characters or Japanese kanji. Image classification is further used in facial recognition for applications such as biometric security and automatic tagging of photographs online, in image organisation, in keyword generation for online images, in object detection in autonomous vehicles or vehicles with advanced driver assistance systems (ADAS), in robotics applications, and in medical applications in which symptoms appearing in a medical image such as a magnetic resonance imaging (MRI) scan or an ultrasound image are classified to assist in diagnosis.

In addition to image classification, the present method may be used in classification tasks for other types of data, such as audio data, time-series data, record data or any other suitable form of data. Depending on the type of data, specialised kernels may be used, for example kernels exhibiting a convolutional structure in the case of image data, or kernels exhibiting periodicity in the case of periodic time-series data.

In any of the above applications, mapping a set of data points to a surface of a hypersphere and performing sparse variational inference with spherical harmonic inducing functions has a number of advantages compared with known methods. For example, because conventional inducing variables defined by $u_m=f(z_m)$ only have local influence near to the inducing inputs $Z_m$, a large number of inducing inputs is required to cover the input space, particularly in the case of high-dimensional data and/or when a kernel only induces correlation over a short length scale. Using a large number of inducing inputs results in a high computational cost due to the need to invert the dense M×M covariance matrix $K_{uu}$, rendering conventional sparse variational GPs prohibitively expensive for high-dimensional data. By contrast, the spherical harmonic functions used in the present method have non-local influence on the surface of the hypersphere, making it possible to cover a given input space with far fewer inducing functions (i.e. a smaller value of M).

Figure 5A:
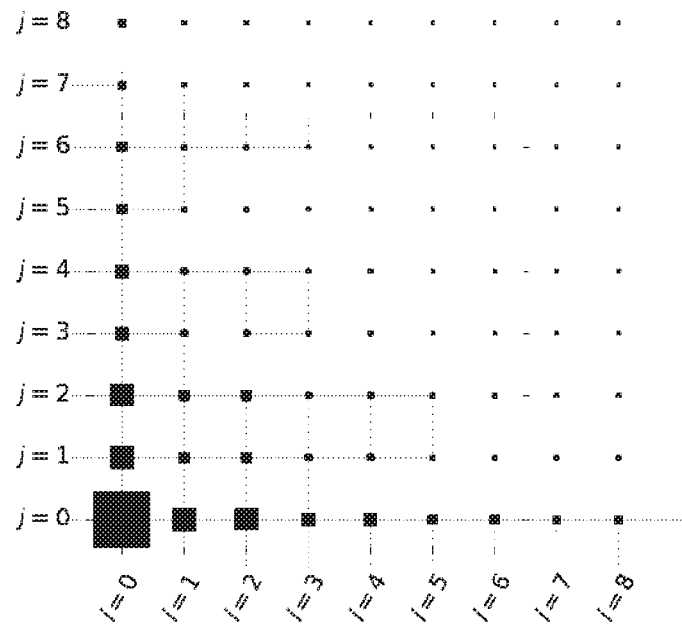
FIGS. 5A and 5B show the variance of different components of two respective different variational Gaussian process models.

As mentioned above, variational Fourier features are inefficient at capturing patterns in high-dimensional data. This issue can be understood in terms of the variance of the inducing variables in a multi-dimensional setting. As predicted by the Karhunen-Loeve decomposition of a GP, the contribution of a given inducing variable to the overall GP signal depends on the inducing variable's prior variance. As an example, for variational Fourier features in two dimensions, each inducing variable depends on a product of two Fourier components labelled i,j. The prior variance of each of the resulting inducing variables for $0 \leq i,j \leq 8$ is illustrated by the respective areas of the black squares in FIG. 5A. It is observed that the inducing variables with the highest prior variances lie along the axes i=0 and j=0. Nevertheless, for a fixed number M, variational Fourier features selects inducing variables based on pairs of Fourier components within a square region $0 \leq i,j < \sqrt{M}$ (for example, M=81 would use all of the Fourier component pairs shown in FIG. 5A). The number of inducing variables increases with the square of the number of Fourier components, but most of these inducing variables provide little contribution to the GP, whereas important inducing variables for which $i > \sqrt{M}$ or $j > \sqrt{M}$ are omitted. In higher dimensions, the situation is significantly worse, with the number of inducing variables growing exponentially with the number of dimensions. Using even the most restricted basis of Fourier components {1, cos, sin} in eight dimensions would lead to more than 6500 inducing variables. These examples make clear that variational Fourier features are highly inefficient and prohibitively expensive for modelling high-dimensional data.

Figure 5B:
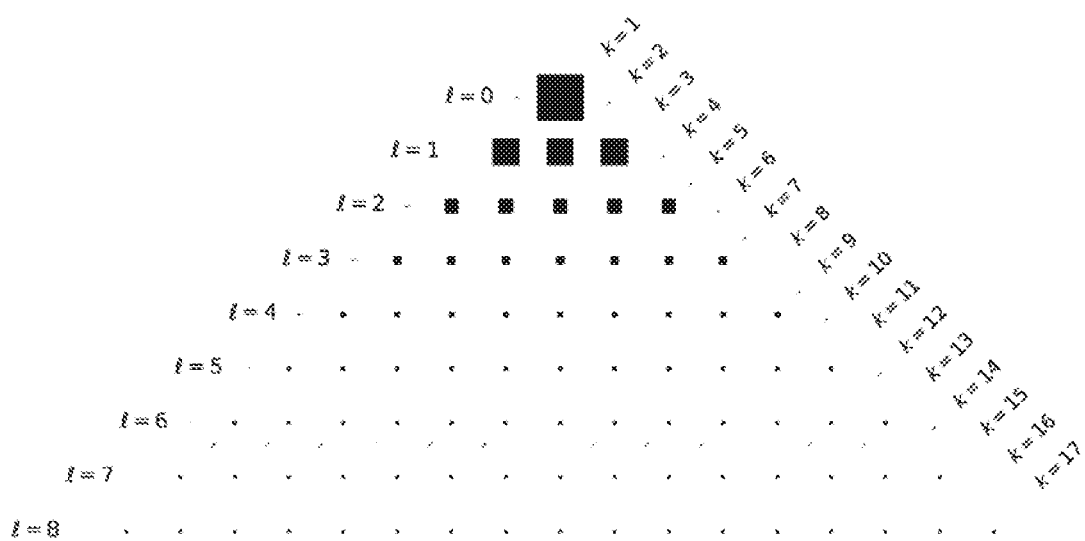

FIG. 5B shows the variance of inducing variables using spherical harmonics on a hypersphere $\mathbb{S}^2$ corresponding to data points with a two-dimensional input. It is clearly observed that the inducing features with the highest prior variance correspond to those from the lowest level l, and the variance of the inducing variables decreases with increasing l. Therefore, following the strategy of labelling the inducing variables with indices m ordered first by increasing level l, then by increasing k within each level l, and selecting inducing variables with the lowest values of m, is guaranteed to capture the inducing variables that provide the greatest contribution to the signal. For this reason, spherical harmonic inducing functions are highly efficient at capturing the relevant information within a GP model.

As mentioned above, the present method results in a diagonal covariance matrix, which can be inverted in $O(M)$ operations as opposed to $O(M^3)$ operations, and has a storage footprint of $O(M)$ as opposed to $O(M^2)$, when compared with a dense covariance matrix. The diagonal covariance matrix leads to a further advantage when the present method is implemented using a computer system with multiple processing nodes/cores, for example using a GPU or NPU. As mentioned above, the numerical inversion of a dense matrix cannot be parallelised straightforwardly across multiple processing nodes and requires the use of high-precision floating point arithmetic for stability and accuracy. As a result, the computation of the optimisation objective $\mathcal{L}$, or its gradient, during training cannot be parallelised effectively until the matrix inverse is determined. These issues prevent GP models from being implemented efficiently using specialist machine learning hardware in the case of a dense covariance matrix.

Figure 6A:
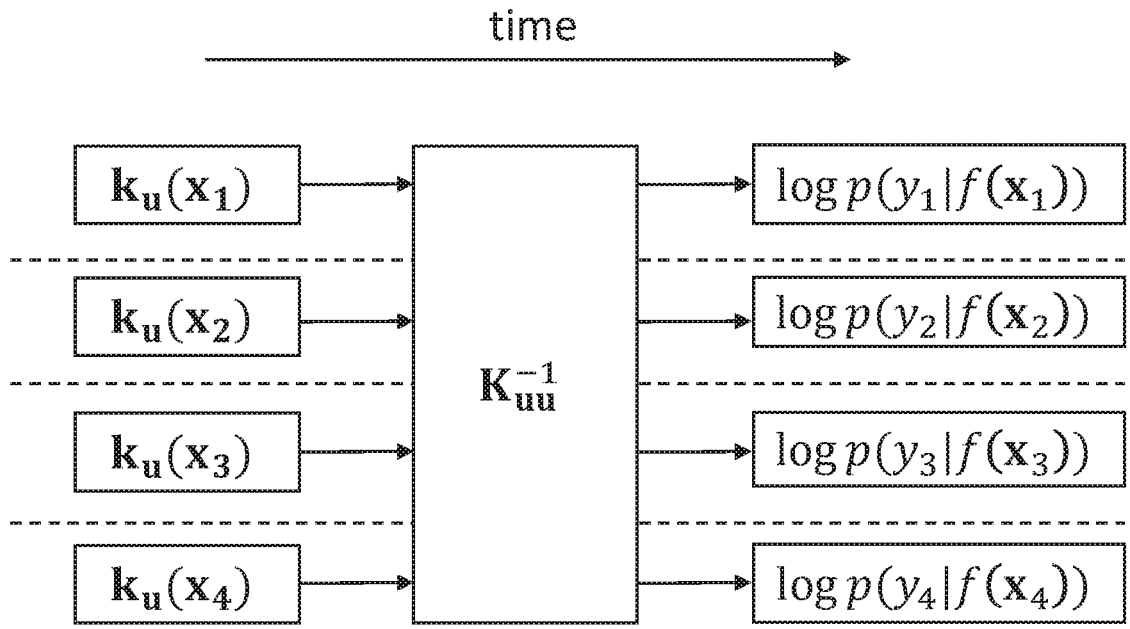
FIGS. 6A and 6B show schematically data processing operations performed by multiple processing nodes in accordance with examples.

FIG. 6A shows processing operations performed by a set of multiple processing nodes (of which four are shown, with operations performed by the different processing nodes shown separated by horizontal dashed lines) to determine or estimate the optimisation objective $\mathcal{L}$ (and, by extension, its gradient using reverse-mode differentiation) in the case of a dense covariance matrix. Each data point $x_n$ within the dataset or alternatively within a randomly-sampled mini-batch is allocated to a respective processing node, and each of the expectation terms in Equation (7) is determined or estimated using the respective allocated processing node. The length-M vectors $k_u(x_n)$ are determined independently by the respective processing nodes.

Having determined the vectors $k_u(x_n)$, the processing nodes must work together to invert the M×M dense covariance matrix $K_{uu}$. Due to the serial operations required for the matrix inversion, the sharing of the workload is not straightforward and involves significant overheads in data being transferred between the nodes, in addition to the intrinsic $O(M^3)$ computational cost. Furthermore, the matrix inversion operation must be performed using high precision arithmetic, for example double or quadruple floating-point precision, to ensure stability and accuracy, with higher precision required for larger covariance matrices. Once the covariance matrix has been inverted, the processing nodes can return to working independently. In the present example, an unbiased estimate of each expectation term is determined independently as a single sample $\log p(y_1|f(x_n))$, which has a computational cost of $O(M^2)$ due to the matrix-vector multiplications in Equations (4) and (5). The resulting computational cost of computing the expectation terms in (and their gradients) is therefore given by $O(M^3+BM^2)$, assuming minibatches of size B are used, including $O(M^3)$ high-precision serial operations for the matrix inversion.

In addition to the gradients of the expectation terms in L, the gradient of the KL term in Equation (7) needs to be determined at each training iteration. The KL term has a closed-form expression given by Equation (13):

$$KL[q(u)\|p(u)] = \frac{1}{2}\left(Tr(K_{uu}^{-1}S) + m^T K_{uu}^{-1} m - M + \log\left(\frac{\det K_{uu}}{\det S}\right)\right). \quad (13)$$

For a dense covariance matrix $K_{uu}$, the trace and log-determinant terms (and their gradients) contribute a further computational cost of $O(M^3)$ operations.

Figure 6B:
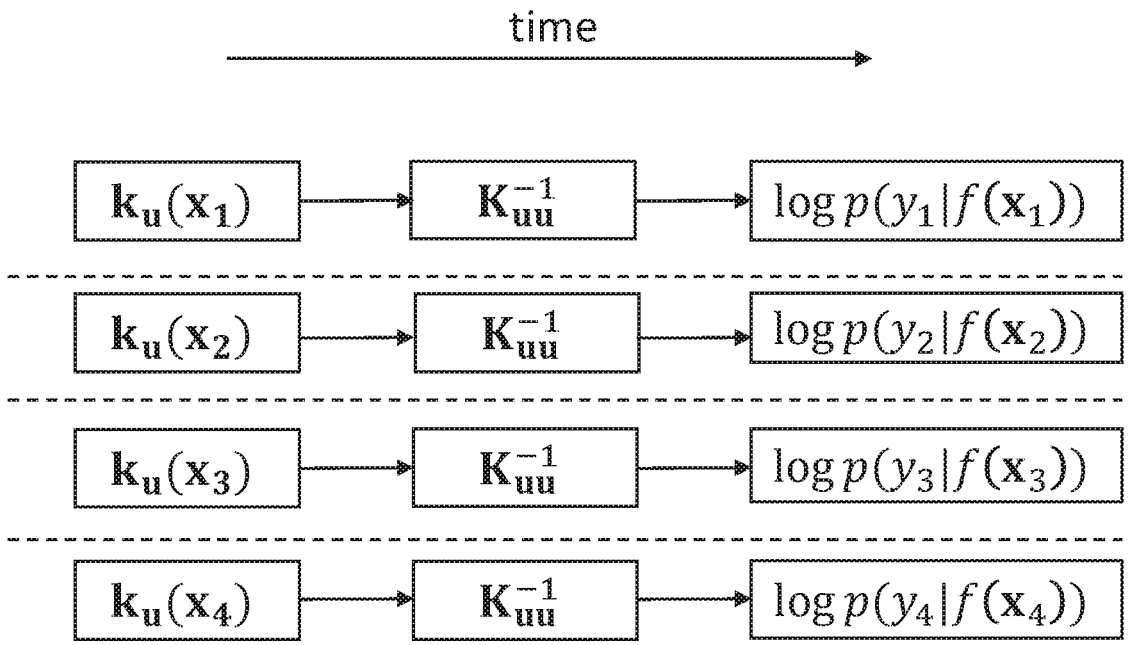

FIG. 6B shows processing operations performed by a set of multiple processing nodes to determine or estimate the optimisation objective $\mathcal{L}$ in the case of a diagonal covariance matrix resulting from the use of spherical harmonic inducing functions on a hypersphere in accordance with the present invention. Each data point $x_n$ within the dataset or alternatively within a randomly-sampled minibatch is allocated to a respective processing node, and the vectors $k_u(x_n)$ are determined in parallel and independently. In this case, because the covariance matrix $K_{uu}$ is diagonal with elements given by $[K_{uu}]_{m,m'}=\delta_{m,m'}/\hat{a}_m$, the inverse covariance matrix is also diagonal with elements given by $[K_{uu}^{-1}]_{m,m'}=\delta_{m,m'}\hat{a}_m$. The computation of $K_{uu}$ and $K_{uu}^{-1}$ can be duplicated or straightforwardly parallelised across the nodes, without significantly adding to the overall computational cost. An unbiased estimate of each expectation term is determined independently as a single sample $\log p(y_1\|f(x_n))$, which has a computational cost of $O(M^2)$ as explained above. The resulting computational cost of computing the expectation terms in $\mathcal{L}$ (and their gradients) is given by $O(BM^2)$, assuming minibatches of size B are used. The computational cost of the KL term of Equation (13) is also reduced from $O(M^3)$ to $O(M^2)$ due to the covariance matrix being diagonal, provided the variational parameter S is parameterised as $S=LL^T$ as discussed above.

In the example of FIG. 6B, the determination of the expectation terms in the optimisation objective $\mathcal{L}$ is "embarrassingly parallel", requiring no communication between the processing nodes. Furthermore, the computations can be performed at low precision, for example by representing the data points and other quantities required for the computations (for example the coefficients $\hat{a}_m$) as single-precision floating-point numbers, or even mapping the numbers to a 16- or 8-bit format or another low-precision format. The process of mapping values to lower precision formats in order to speed up computation is referred to as quantization. The above considerations allow the present method to be accelerated using specialist machine learning hardware such as NPUs, which are typically optimised for such computations.

Figure 7:
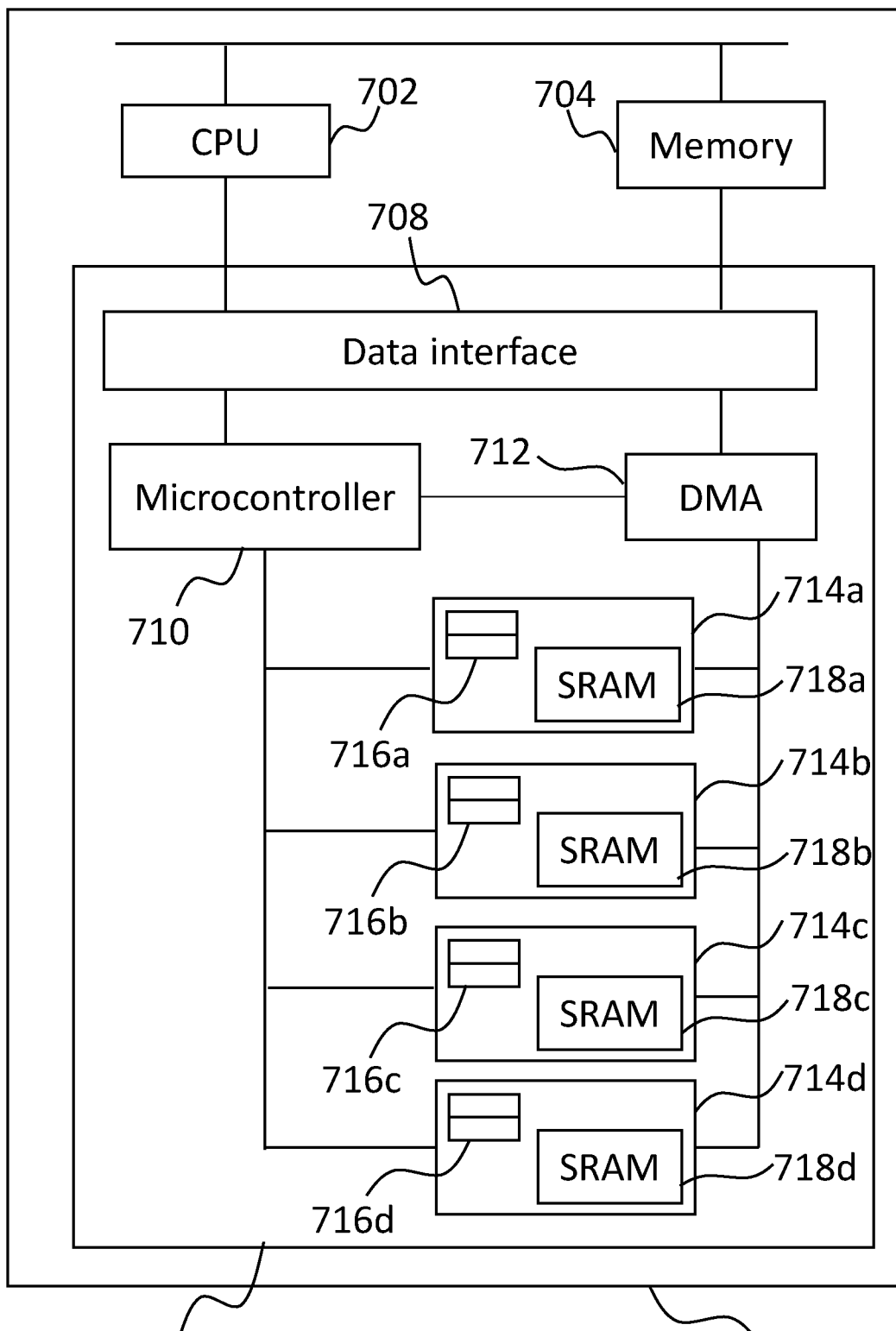
FIG. 7 shows a computing system with a specialist processing unit configured to perform methods in accordance with the present invention.

FIG. 7 shows a computing system 700. The computing system 700 includes a CPU 702 and memory 704. The memory 704 in this example is volatile working memory including DRAM. The computing system 700 includes various additional components not shown in FIG. 7, such as permanent storage, input/output devices, network interfaces, and the like. The computing system 700 also includes a specialist processing unit 706 configured to perform sparse variational inference in accordance with the present invention. In this example, the processing unit 706 is an integrated circuit which is integral to the computing system 700. In other examples, a processing unit may be removable from a computing system. The processing unit 706 in this example is an application-specific standard product (ASSP). Alternatively, the processing unit 706 could be replaced with another type of integrated circuit such as an application-specific integrated circuit (ASIC) or a field-programmable gate array (FPGA).

The processing unit 706 includes a data interface 708 via which the processing unit 706 can exchange data, including control data, with the CPU 702 and the memory 704. The processing unit 706 further includes a microcontroller 710 for controlling processing operations performed by the processing unit 706. A microcontroller is a compact integrated circuit designed to govern a specific set of operations in an embedded system. The microcontroller 710 in this example includes a processor and memory, including control registers and a small amount of RAM. The processing unit 706 further includes multiple processing nodes 714 (of which four, 714a-b, are shown), also referred to as compute engines or processor cores, each including a respective set of control registers 716, respective SRAM 718, and respective processing circuitry arranged to process data stored in the respective SRAM 718 in accordance with control data stored in the respective set of control registers 716. The microcontroller 710 is arranged to overwrite the control data stored by the processing nodes 714 during processing, such that the processing nodes 714 are configured to perform different processing operations at different stages of the training.

The processing unit 706 further includes a direct memory access (DMA) unit 712 arranged to exchange data transfer data between the memory 704 of the computing system 700 and the SRAM of the processing nodes 714, under instruction from the microcontroller 710. The data exchanged by the DMA 712 includes, for example, data points from a dataset $\{(\hat{x}_n,\hat{y}_n)\}_{n=1}^N$, trainable parameter values for a sparse variational GP on a hypersphere, and intermediate values stored at training or test time.

During the training of a sparse variational GP in accordance with the present disclosure, each of the processing nodes 714 is configured to perform a series of operations independently of the other processing nodes 714. In particular, each processing node 714 is configured to: augment a respective subset of the data points to each include an additional dimension comprising a bias value; project each augmented data point of the respective subset onto a surface of a unit hypersphere of the first number of dimensions; process each projected augmented data point of the respective subset to determine a respective covariance vector with elements given by spherical harmonics in the first number of dimensions evaluated at the projected augmented data point; and determine at least a portion of a diagonal covariance matrix with each element given by a variance of a respective one of a set of inducing variables randomly distributed according to a multi-dimensional Gaussian distribution and each corresponding to a reproducing kernel Hilbert space inner product between a sparse variational GP on said unit hypersphere and a spherical harmonic of the first number of dimensions. The processing unit 706 is further arranged to determine a set of parameter values for the sparse variational GP using the determined covariance vectors and the determined diagonal covariance matrix.

In the present example, the determination of the diagonal elements of the covariance matrix (or, alternatively, its inverse), is parallelised across the processing nodes 714, such that each of the processing nodes 714 independently determines a portion of the diagonal covariance matrix. The processing nodes 714 are arranged to share the determined portions of the diagonal covariance matrix in order for subsequent use in determining the parameter values for the sparse variational GP.

The expressive capacity of any single-layer GP model, including those described in the present disclosure, is limited by the choice of kernel function. Extending a GP model to having a deep structure can further improve the expressive capacity. In an example, a deep GP architecture is based on a composition of functions $f_R(g_R(\ldots, (f_1(g_1(\bullet))))$. Each of a set of layers $r=1, \ldots, R$ includes a composition of a response function $f_r$ and a mapping function $g_r$. Each of the response functions $f_r: \mathbb{S}^{d_{r-1}} \to \mathbb{R}^{d_r}$ is given a GP prior defined on a unit hypersphere such that $f_r \sim GP(\mu_r(\bullet), K_r(\bullet,\bullet'))$ where $\mu_r$ is a mean function and $K_r$ is a zonal kernel. Each of the mapping functions $g_r: \mathbb{R}^{d_{r-1}} \to \mathbb{S}^{d_{r-1}}$ defines a mapping from the hyperplane $\mathbb{R}^{d_{r-1}}$ to the unit hypersphere $\mathbb{S}^{d_{r-1}}$, as described in the present disclosure. The joint density for the deep GP model is given by Equation (14):

$$p(\{y_n\}, \{h_{nr}\}, \{f_r\}) = \prod_{n=1}^{N} p(y_n \mid h_{n,R}) \prod_{l=1}^{L} p(h_{nr} \mid f_r(g_r(h_{nr-1}))) p(f_r), \quad (14)$$

in which $h_{n,0} \equiv \hat{x}_n$ is the input portion of a data point $(\overline{x}_n, \hat{y}_n)$ and the (predetermined) form of $p(h_{n,r} \mid f_r(g_r(h_{n,r-1})))$ determines how the output $h_{n,r}$ of a given GP layer depends on the output of the response function for that layer, and may be chosen to be stochastic or deterministic. In a specific example, the output of the layer is equal to the output of the response function, such that $p(h_{n,r} \mid f_r(g_r(h_{n,r-1}))) = \delta(h_{n,r} - f_r(g_r(h_{n,r-1})))$. Each GP layer of the deep GP is approximated by a variational GP $q(f_r)$ depending on a set of inducing variables $u_r = \{u_m^r\}_{m=1}^{M_r}$ with $u_m^r = \langle f_r, \phi_m^r \rangle_H$, where $\phi_m^r$ are elements of the spherical harmonic basis with the appropriate number of dimensions for the $r^{th}$ layer. The inducing variables at each level are distributed according to a respective Gaussian distribution $q(u_r) = N(u_r \mid m_r, S_r)$.

In the accordance with the present invention, an optimisation objective $\mathcal{L}_{DGP}$ is given by Equation (15):

$$\mathcal{L}_{DGP} = \sum_{n=1}^{N} \mathbb{E}_{q(\{h_{n,r}\},\{f_r\})}[\log p(y_n \mid h_{n,L})] - \sum_{r=1}^{R} KL[q(u_r) \| p(u_r)], \quad (15)$$

which is to be optimised with respect to the variational parameters $m_r$, $S_r$ at each level, along with any hyperparameters of the DGP model (for example, the bias value $b_r$ used in the mapping function at each layer). The posterior density appearing in Equation (15) is given by $q(\{_{n,r}\}, \{f_r\}) = \Pi_{n=1}^{N} \Pi_{r=1}^{R} p(h_{n,r} \mid f_r(g_r(h_{n,r-1}))) q(f_r)$, with the density $q(f_r)$ for each layer being Gaussian with a respective mean function and covariance given by Equations (4) and (5) (with the input x replaced with $h_{n,r-1}$ where appropriate). In effect, each layer of the DGP is analogous to the single layer GP model described above, and the computational benefits of the present method apply for each level within the DGP model. In further examples, a DGP can include multiple layers, with one or more of the layers being sparse variational GPs on a hypersphere as described herein, with other layers of the DGP being of a different form.

The above embodiments are to be understood as illustrative examples of the invention. Further embodiments of the invention are envisaged. According to embodiments there is provided a computer-implemented method including: obtaining a plurality of data points each having an input portion and an empirical output portion, the input portion having a first number of dimensions; augmenting each data point to include an additional dimension comprising a bias value; projecting each augmented data point onto a surface of a unit hypersphere of the first number of dimensions; determining, using the projected augmented data points, a set of parameter values for a sparse variational Gaussian process, GP, defined on said unit hypersphere, the sparse variational GP having a zonal kernel and depending on a set of inducing variables randomly distributed according to a multi-dimensional Gaussian distribution and each corresponding to a reproducing kernel Hilbert space inner product between the GP and a spherical harmonic of the first number of dimensions.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A system comprising:
   one or more sensors configured to measure one or more characteristics of a physical system having a plurality of enforceable parameters;
   processing circuitry; and
   memory circuitry storing machine-readable instructions which, when executed by the processing circuitry, cause the system to:
   determine a plurality of candidate sets of values for the enforceable parameters; and
   for each of the candidate sets of values for the plurality of enforceable parameters:
     obtain, from the one or more sensors, a measurement of each of the one or more characteristics of the physical system;
     determine a performance measurement for the physical system based on the obtained measurements of the one or more characteristics of the physical system; and
     generate a data point having an input portion indicative of the candidate set of values and an output portion indicative of the determined performance measurement, the input portion having a first number of dimensions;
   augment each data point to include an additional dimension comprising a bias value;
   project each augmented data point onto a surface of a unit hypersphere of the first number of dimensions;

determine, using the projected augmented data points, a set of parameter values for a sparse variational Gaussian process, GP, on said unit hypersphere, the sparse variational GP having a zonal kernel and depending on a set of inducing variables randomly distributed according to a multi-dimensional Gaussian distribution and each corresponding to a reproducing kernel Hilbert space inner product between the GP and a spherical harmonic of the first number of dimensions; and determine, using the sparse variational GP with the determined set of parameter values, a further set of values for the plurality of enforceable parameters.

2. The system of claim 1, wherein the processing circuitry comprises a plurality of processing nodes, each configured to, independently of each other processing node of the plurality of processing nodes:

process a respective subset of the projected augmented data points to determine, for each projected augmented data point of the respective subset, a respective covariance vector with elements given by spherical harmonics in the first dimension evaluated at the projected augmented data point; and determine at least a portion of a diagonal covariance matrix with each element given by a variance of a respective inducing variable of the set of inducing variables, where the system is arranged to determine the set of parameter values for the sparse variational GP using the determined covariance vectors and the determined diagonal covariance matrix.

3. The system of claim 1, wherein:
the physical system comprises one or more components of a vehicle;
the plurality of enforceable parameters are enforceable parameters of the one or more components of the vehicle; and
each of the performance measurements for the physical system is indicative of a performance of the one or more components of the vehicle according to a predetermined metric.

4. The system of claim 3, wherein the one or more components of the vehicle include on or more of: an engine; an aerodynamic component; and a braking system.

5. The system of claim 1, arranged to:
obtain, using the one or more sensors, further measurements of the one or more characteristics of the physical system using the further set of values for the enforceable parameters; and
determine a further performance measurement for the physical system based on the obtained further measurements of the one or more characteristics of the physical system.

6. The system of claim 5, arranged to:
generate a further data point having an input portion indicative of the further set of values for the enforceable set of parameters and an output portion indicative of the further performance measurement for the physical system;
augment the further data point to include an additional dimension comprising the bias value;
project the augmented further data point onto the surface of said unit hypersphere; and
update, using the further data point, the set of parameter values for the sparse variational GP.

7. The system of claim 1, wherein the processing circuitry comprises a plurality of processing nodes, each configured to, independently of each other processing node of the plurality of processing nodes:

process a respective subset of the projected augmented data points to determine, for each projected augmented data point of the respective subset, a respective covariance vector with elements given by covariances between the projected augmented data point and each of the set of inducing variables;

determine at least a portion of a diagonal covariance matrix with each element given by a variance of a respective inducing variable of the set of inducing variables; and estimate, for each projected augmented data point of the respective subset, using the respective covariance vector and the diagonal covariance matrix, a respective component of an objective function, wherein the determining of the set of parameter values for the sparse variational GP is based on the respective components of the objective function.

8. A method comprising:
determining a plurality of candidate sets of values for a plurality of enforceable parameters of a physical system;
for each of the plurality of candidate sets of values:
obtaining a respective performance measurement for the physical system; and
generating a respective data point having an input portion indicative of the candidate set of values and an output portion indicative of the respective performance measurement, the input portion having a first number of dimensions; and
at a computing system:
augmenting each data point to include an additional dimension comprising a bias value;
projecting each augmented data point onto a surface of a unit hypersphere of the first number of dimensions;
determining, using the projected augmented data points, a set of parameter values for a sparse variational GP on said unit hypersphere, the sparse variational GP having a zonal kernel and depending on a set of inducing variables randomly distributed according to a multi-dimensional Gaussian distribution and each corresponding to a reproducing kernel Hilbert space inner product between the GP and a spherical harmonic of the first number of dimensions; and
determining, using the sparse variational GP with the determined set of parameter values, a further set of values for the plurality of enforceable parameters.

9. The method of claim 8 comprising, by each of a plurality of processing nodes, independently of each other processing node of the plurality of processing nodes:

processing a respective subset of the projected augmented data points to determine, for each projected augmented data point of the respective subset, a respective covariance vector with elements given by covariances between the projected augmented data point and each of the set of inducing variables; and determining at least a portion of a diagonal covariance matrix with each element given by a variance of a respective one of the plurality of inducing variables, the method comprising determining the set of parameter values for the sparse variational GP using the determined covariance vectors and the determined diagonal covariance matrix.

10. The method of claim 8, wherein obtaining each of the respective performance measurements comprises measuring one or more characteristics of the physical system using one or more sensors.

11. The method of claim 8, wherein:
the physical system comprises one or more components of a vehicle;
the plurality of enforceable parameters correspond to physical characteristics of the one or more components of the vehicle; and
the performance measurements for the physical system are indicative of performance of the one or more components of the vehicle according to a predetermined metric.

12. The method of claim 11, wherein the one or more components of the vehicle include on or more of: an engine; an aerodynamic component; and a braking system.

13. The method of claim 8, further comprising obtaining a further performance measurement for the physical system using the further set of values for the plurality of enforceable parameters.

14. The method of claim 13, further comprising:
generating a further data point having an input portion indicative of the further set of values and an output portion indicative of the further performance measurement for the physical system, the input portion having the first number of dimensions; and
at the computer system:
augmenting the further data point to include an additional dimension comprising the bias value;
projecting the augmented further data point onto the surface of said unit hypersphere; and
updating, using the further data point, the set of parameter values for the sparse variational GP.

15. The method of claim 8, further comprising determining the further set of values for the plurality of enforceable parameters based on an expected performance measurement for the physical system using the further set of values for the plurality of enforceable parameters.

16. The method of claim 8, further comprising determining the further set of values for the plurality of enforceable parameters based on a predicted quantile of a performance measurement for the physical system using the further set of values for the plurality of enforceable parameters.

17. The method of claim 8, further comprising:
mapping each of the plurality of data points from a first numerical format with a first precision to a second numerical format with a second precision, the second precision being lower than the first precision; and
determining the set of parameter values for the sparse variational GP using numerical operations configured for the second numerical format.

18. A processing unit for use in a computing system, the processing unit comprising:
a data interface configured to receive a plurality of data points each having an input portion and an output portion, the input portion having a first number of dimensions; and
a plurality of processing nodes, each configured to, independently of each other processing node of the plurality of processing nodes:
augment a respective subset of the data points to each include an additional dimension comprising a bias value;
project each augmented data point of the respective subset onto a surface of a unit hypersphere of the first number of dimensions;
process each projected augmented data point of the respective subset to determine a respective covariance vector with elements given by spherical harmonics in the first number of dimensions evaluated at the projected augmented data point; and
determine at least a portion of a diagonal covariance matrix with each element given by a variance of a respective one of a set of inducing variables randomly distributed according to a multi-dimensional Gaussian distribution and each corresponding to a reproducing kernel Hilbert space inner product between a sparse variational GP on said unit hypersphere and a spherical harmonic of the first number of dimensions,
wherein the processing unit is further configured to determine a set of parameter values for the sparse variational GP using the determined covariance vectors and the determined diagonal covariance matrix.

19. The processing unit of claim 18, configured to:
map each of the plurality of data points from a first numerical format with a first precision to a second numerical format with a second precision, the second precision being lower than the first precision; and
determine the set of parameter values for the sparse variational GP using numerical operations configured for the second numerical format.

20. The processing unit of claim 18, being any one of an application-specific standard product, ASSP, an application-specific integrated circuit, ASIC, or a field-programmable gate array, FPGA.

* * * * *